3,317,601
SYNTHESIZING UREA
Eiji Otsuka, Fujisawa, Shinji Yoshimura, Kamakura, and Kazumichi Kanai, Fujisawa, Japan, assignors to Toyo Koatsu Industries, Incorporated, Tokyo, Japan, a corporation of Japan
Filed Mar. 28, 1963, Ser. No. 268,769
Claims priority, application Japan, Aug. 8, 1962, 37/32,666
12 Claims. (Cl. 260—555)

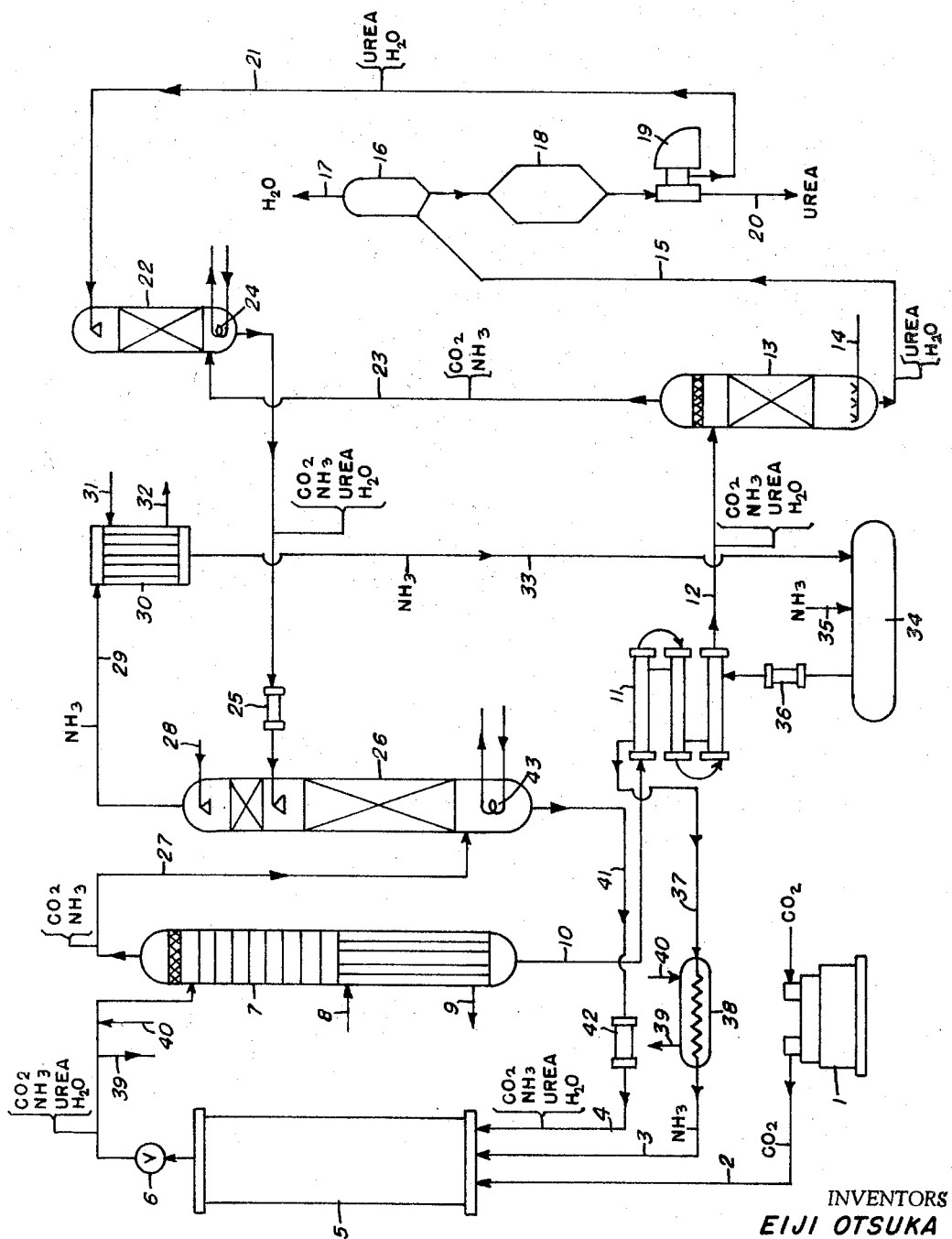

This invention relates to an improvement in the solution recycle process for synthesizing urea.

Urea is industrially produced by reacting ammonia with carbon dioxide at high temperature and pressure. This reaction proceeds in accordance with the following formula:

$$2NH_3 + CO_2 \rightarrow NH_4CO_2NH_2 \qquad (1)$$
$$NH_4CO_2NH_2 \rightarrow NH_2CONH_2 + H_2O \qquad (2)$$

The reaction represented by the Formula 1 is a quick reaction which finishes easily but the reaction represented by the Formula 2 is a comparatively slow reaction which does not easily reach chemical equilibrium. Therefore, unreacted ammonia and carbon dioxide must be recovered to be reused in the synthesis of urea.

The method which is widely used at present for recovering unreacted ammonia and carbon dioxide and reusing them in the synthesis of urea is the so-called solution recycle process wherein unreacted ammonia and carbon dioxide distilled from the effluent from a urea synthesis reactor are absorbed in suitable absorbing solvent, such as, for example, water, an aqueous solution of urea or an aqueous solution of urea and ammonium carbamate and are reused by being circulated back through the urea synthesis reactor.

In the solution recycle process, it is necessary, from the viewpoint of conversion efficiency from $CO_2$ and $NH_3$ to urea, to absorb the unreacted ammonia and carbon dioxide distilled from the reactor effluent in the minimum necessary amount of absorbent. However, in any conventional method, the water distilled out when distilling off unreacted ammonia and carbon dioxide from the reactor effluent has never been taken into consideration. This water has played the part of an absorbent and therefore no effort has been made to reduce the quantity thereof. Instead, the water distilled from the reactor effluent is always re-circulated to the reactor in the conventional solution recycle process. Though such water plays the part of an absorbent for the distilled ammonia and carbon dioxide, it nevertheless requires a large amount of heat for vaporization in every re-circulation. Therefore, the conventional solution recycle process has the drawback of an unnecessarily high heat consumption.

An object of the present invention is to provide improvements in the solution recycle method for synthesizing urea.

Another object is to provide an improved solution recycle method for synthesizing urea wherein a gaseous mixture of ammonia and carbon dioxide of a low water content is obtained by an improved method of distilling unreacted ammonia and carbon dioxide from the effluent of the urea synthesis reactor.

Another object is to provide a method for synthesizing urea wherein the re-circulation of unreacted ammonia and carbon dioxide is effected more efficiently and economically.

Another object is the provision of a process of producing high quality urea having an extremely low biuret content.

The method of the present invention comprises the steps of (1) feeding the effluent from a urea synthesis reactor wherein ammonia and carbon dioxide are reacted at a urea synthesizing temperature and pressure into the top part of a high pressure rectifying column, (2) subjecting the effluent to rectification at a pressure of about 10 to 25 kg./cm.$^2$ gauge, a column top temperature (head temperature) of about 90 to 130° C. and a column bottom temperature (still temperature) of about 130 to 170° C. to distill off at least 88 percent of the unreacted ammonia and carbon dioxide contained in the said effluent on the basis of the carbon dioxide and to obtain a gaseous mixture comprising ammonia and carbon dioxide and a depleted liquid containing the remaining parts of the unreacted ammonia and carbon dioxide, (3) feeding the depleted liquid from the high pressure rectifying column into a low pressure rectifying column, (4) subjecting said depleted liquid to rectification at a pressure of about 0 to 3 kg./cm.$^2$ gauge, a column top temperature (head temperature) of about 60 to 110° C. and a column bottom temperature (still temperature) of about 100 to 140° C. to distill off substantially all of the remaining unreacted ammonia and carbon dioxide contained therein and to obtain a gaseous mixture comprising ammonia and carbon dioxide and an aqueous solution of urea, (5) concentrating the aqueous solution of urea from the low pressure rectifying column, (6) subjecting the concentrated solution to crystallization to obtain urea crystals and a urea-containing mother liquor, (7) absorbing the gaseous mixture from the low pressure rectifying column in said mother liquor to obtain an absorbate, (8) raising the pressure of said absorbate, (9) absorbing the gaseous mixture from the high pressure rectifying column in the said absorbate and (10) circulating the resulting absorbate back through the urea synthesis zone.

In any synthesis of urea by reacting $CO_2$ and $NH_3$, the water formed thereby must always be removed from the system by a suitable means, e.g., preferably by evaporation, when concentrating and recovering urea after the unreacted ammonia and carbon dioxide have been distilled off.

In the conventionally practiced high pressure distillation of the effluent from the reactor, e.g., using distillation conditions of a pressure of 10 to 25 kg./cm.$^2$ gauge and a temperature of 130 to 170° C., the water content in the gaseous mixture of ammonia and carbon dioxide is 12 to 20 percent by volume. This contained water consumes a considerable amount of heat for vaporization which heat must be subsequently removed when the gaseous mixture is absorbed in an absorbent for re-circulation to the reactor.

It has now been surprisingly discovered that a gaseous mixture having a water content of less than 10 percent by volume and containing 88 percent or more (based on the $CO_2$) of the unreacted $CO_2$ and $NH_3$ in the effluent can be removed from the effluent in accordance with this invention by feeding the effluent, depressurized to a pressure of about 10 to 25 kg./cm.$^2$ gauge, into the top part of a high pressure rectifying column having 5 to 10 plates (shelves), or a packing height corresponding to them, and rectifying the effluent therein at a pressure of about 10 to 25 kg./cm.$^2$ gauge, a column top temperature of about 90 to 130° C. and a column bottom temperature of about 130° to 170° C. This represents a considerable saving of energy ordinarily necessary for vaporizing excess water and subsequently cooling it when absorbed in an absorbent for recycle to the reactor.

In preventing water in the effluent from being distilled off the temperature at the top of the high pressure rectifying column is maintained as low as possible, e.g., about 90 to about 130° C., consistent with the solidification temperature of the urea in the effluent entering the column and condensation temperature of the gas being distilled off. When the effluent fed into the high pressure rectifying column is depressurized to a pressure of about 10 to 25 kg./cm.$^2$ gauge from the pressure in the reactor, the temperature of the effluent falls. However, in case the temperature of the effluent is still too high to maintain the column top temperatures in the high pressure rectifying column as described above, the effluent should be cooled by such suitable means as exchanging heat with liquid ammonia about to be fed into the reactor, cooling it with the latent heat of evaporation of liquid ammonia introduced into the depressurized effluent or cooling it with cool or warm water.

The depleted liquid evolving from the high pressure rectifying column is preferably introduced into the top of a low pressure rectifying column and is rectified therein at a pressure of about 0 to 3 kg./cm.$^2$ gauge, a column top temperature of about 60 to 110° C. and a column bottom temperature of about 100 to 140° C. The depleted liquid, however, may be introduced into the middle part of the low pressure rectifying column and the gas distilled therefrom may be cooled to the above-mentioned temperature in the top part of said low pressure rectifying column by a reflux condenser mounted on the top of said column. By this rectification, substantially all of the unreacted ammonia and carbon dioxide remaining in the depleted liquid is distilled off. The water content in the gaseous mixture thus distilled off is surprisingly only 7 to 30 percent by volume. On the other hand, in the conventional distillation carried out at a pressure of about 0 to 3 kg./cm.$^2$ gauge and a temperature of about 100 to 140° C., the water content in the gaseous mixture distilled off is 35 to 80 percent by volume and is notably higher than in the case of the present invention. Controlling the column top temperature at about 60 to about 110° C. avoids the solidification of urea in the depleted liquid leaving the high pressure rectifying column and avoids the condensation of ammonia, carbon dioxide and water leaving the low pressure distilling column. The depleted liquid from the high pressure rectifying column in being fed to the low pressure rectifying column should be cooled, e.g., by exchanging heat with the liquid ammonia being fed to the reactor, or by any other means so that its temperature may be kept consistent with the above-mentioned rectifying temperature.

Indirect heating by steam may be used to heat the low pressure rectifying column or steam may be blown directly into the bottom part of the column. Directly blowing steam into the bottom part of the column is very favorable to the perfect distillation of unreacted ammonia and carbon dioxide. But, on the other hand, there is a defect in that it is of the same effect as of putting water into the urea synthesis system from outside and that the water must be removed in the concentrating step. However, in the case of the present invention, heat generated in a high pressure absorbing column subsequently employed can be utilized as a heat source for a vacuum concentrating step as described later and has been found sufficient to drive out the small amounts of water equivalent to the steam blown into the low pressure rectifying column. Therefore the above-mentioned defect can be well overcome.

The aqueous solution of urea evolving from the low pressure rectifying column is introduced into a concentrating step. In this step water, equivalent to the water produced in the urea synthesizing reaction and to the steam, if any, blown into the low pressure rectifying column for heating purposes, is removed from the solution. The solution is then subjected to crystallization thereby separating crystalline urea and leaving a mother liquor. Most of any biuret produced in the process remains dissolved in the mother liquor and very little, if any, of it is contained in the crystalline urea. Therefore, as a result of the present invention, the urea produced is of a very low biuret content. After absorbing the gaseous mixtures of ammonia and carbon dioxide from the low pressure rectifying column and high pressure rectifying column in the mother liquor, as described hereinafter, the mother liquor is circulated to the reactor wherein the biuret contained thereby reacts with ammonia to be converted to urea. Therefore no biuret accumulates in the system and the biuret content in the system is kept to a minimum.

The steps of concentration and crystallization of the aqueous solution of urea from the low pressure rectifying column are better carried out in a vacuum, because the concentrating temperature is thereby kept low and the aqueous solution of urea and the urea slurry in the concentrating step can be utilized as a cooling medium for the high pressure absorption described hereinafter. The heat requirement for the concentration can be met with the absorption heat of the ammonia and carbon dioxide in the high pressure absorbing column and, furthermore, the heat of crystallization of urea and the sensible heat of the aqueous solution of urea can be effectively used for the evaporation of water. The pressure in the concentrating step and crystallizing step is preferably maintained at about 40 to 100 mm. Hg.

The mother liquor from which urea crystals have been separated is introduced into a low pressure absorbing column in which the mother liquor absorbs the gaseous mixture of ammonia and carbon dioxide from the low pressure rectifying column. The resulting absorbate is then compressed to a pressure of about 10 to 25 kg./cm.$^2$ gauge and is introduced into a high pressure absorbing column in which the absorbate absorbs the gaseous mixture of ammonia and carbon dioxide from the high pressure rectifying column. The absorbate thus obtained is then circulated to the reactor. A part of the ammonia in the gaseous mixture remains unabsorbed in the high pressure absorbing column. It is therefore washed with water or a part of the urea mother liquor under a pressure of 10 to 25 kg./cm.$^2$ gauge whereby the slight amount of carbon dioxide contained therein is removed. The ammonia, thus freed from carbon dioxide, is then cooled and liquefied and is circulated together with fresh ammonia to the reactor. In this case, the resulting water or the urea mother liquor employed in washing the ammonia has absorbed therein carbon dioxide and some ammonia and is used as an absorbent for the high pressure absorbing column.

The method of the present invention can be applied quite alike to the synthesis of urea by reacting ammonia with carbon dioxide in their stoichiometric quantities as well as by employing amounts of ammonia in excess of its stoichiometric quantity, that is, the case wherein the mol ratio of $NH_3:CO_2$ is within the range of 2:1 to 6:1.

One advantage of the present invention is that the rate of distillation of unreacted ammonia and carbon dioxide in the high pressure rectification is very high. For example, in the single distillation under the conditions of 15 kg./cm.$^2$ gauge and 150° C., a maximum rate of distillation of only about 85 percent is obtained, whereas, in the high pressure rectification in the method of the present invention, under the same conditions of pressure and column bottom temperature, a rate of distillation of about 92 percent is obtained. This means that the amounts of unreacted ammonia and carbon dioxide to be rectified in the low pressure rectification are small. Thus, even if a comparatively small amount of the urea mother liquor is used as an absorbent, the ammonia and carbon dioxide from the low pressure rectification can be substantially completely absorbed therein at the low pressure.

Another advantage of the present invention will become clear if the method of the present invention is compared with a conventional method, for example, with that of the United States Patent No. 2,116,881. In the method of this patent, the water in the distillation gas in the second carbamate still is 70.4 percent by volume and under the conditions of 20 lbs./in.$^2$ and 120° C. shown in the said patent, such large amounts of water are unavoidable. That is to say, in the case of attempting the complete distillation of unreacted ammonia and carbon dioxide at a pressure as low as possible, an extremely large amount of water in the gas being distilled off is unavoidable. Further, it is mentioned in another prior art method, taught by Japanese patent publication No. 8,263/1962, that the gaseous mixture of ammonia, carbon dioxide and water distilled in an ammonium carbamate decomposer in the second stage may be sent, for example, to an ammonium nitrate plant to utilize only the ammonia or may be separated into the respective components and recirculated for the synthesis of urea.

There is no teching in either the above-mentioned United States patent or Japanese patent of any suitable method of treating the large amount of water in the gaseous mixture distilled off and such mixture can hardly be reused directly in the synthesis of urea. If the gaseous mixture distilled off is reused by circulating it for urea synthesis as shown in United States Patent No. 2,116,881, due to the large amount of water contained therein, the necessary urea synthesizing conditions become so severe as to require a pressure of 6,000 lbs./in.$^2$ and a temperature of 210° C. This is commercially impossible from the viewpoint of corrosion and/or consumption of power and/or steam.

The present invention makes it possible to now completely reuse unreacted ammonia and carbon dioxide. In this sense, it has a feature unknown in the prior art, specifically the economic distillation of unreacted ammonia and carbon dioxide. The water content in the rectified gaseous mixture or specifically in the gas distilled out of the low pressure rectification column can be made so low as to be about 7 to 30 percent by volume. Thus, the urea mother liquor increased by an amount corresponding to this water can be used as an absorbent. Further, since the recycle water is prevented as much as possible from being evaporated, the heat corresponding to the latent heat for evaporation is saved and the method of the present invention is high in heat economy.

A third advantage of the present invention is that, as described above, the biuret content in the urea produced is so low that crystalline urea of a biruet content, for example, of only 0.01 to 0.02 percent is obtained.

Other advantages of the present invention will be apparent in the following detailed description given with reference to the accompanying drawing which is a diagrammatic flow chart illustrating one embodiment of the present invention.

Carbon dioxide compressed by means of a carbon dioxide compressor 1, liquid ammonia and a recovered solution which contains absorbed unreacted ammonia and carbon dioxide are introduced into a urea synthesis reactor 5 through conduit pipes 2, 3 and 4 respectively, and are kept at a known urea synthesizing temperature and pressure, for example, in the ranges of 180 to 190° C. and 230 to 250 kg./cm.$^2$ gauge.

The resulting urea synthesis effluent is depressurized to a pressure of 10 to 25 kg./cm.$^2$ gauge by means of a pressure reducing valve 6 and is introduced into the top of a high pressure rectifying column 7. The temperature of the high pressure rectifying column 7 is kept at about 90 to about 130° C. in the top part and at about 130 to about 170° C. in the bottom part. The temperature of the effluent drops due to the pressure reduction to a temperature consistent with the temperature of the top of the high pressure rectifying column substantially within about 90 to about 130° C. However, in case the temperature is still too high after depressurization, the effluent can be cooled by exchanging heat with the liquid ammonia about to be introduced into the reactor 5, or liquid ammonia can be added to the effluent to reduce the temperature thereof by the latent heat of evaporation of the added liquid ammonia. Needless to say, the effluent can be cooled by exchanging heat with cold or warm water. The high pressure rectifying column 7 consists of an upper rectifying part having 5 to 10 shelves or a packing height corresponding thereto and a lower heating part which is indirectly heated by introducing steam through a pipe 8. Pipe 9 is a drain pipe for water condensed from said steam. When the effluent is rectified by keeping the above-mentioned column bottom and top temperatures in the column 7, at least 88 percent of the unreacted ammonia and carbon dioxide (based on carbon dioxide) is distilled off and the water content in the gaseous mixture distilled off is less than 10 percent by volume.

The depleted liquid discharged out of the high pressure rectifying column 7 is introduced into a liquid ammonia preheater 11 through a conduit pipe 10, is made to exchange heat with the liquid ammonia going to the urea synthesis reactor, and is introduced into the top part of a low pressure rectifying column 13. In addition, a part of the depleted liquid discharged out of the high pressure rectifying column 7 may be forcibly circulated to the heating part of said column by means of a pump so that the rate of distillation therein may be improved. (This circulating system is now shown.) The low pressure rectifying column 13 is kept at a pressure of about 0 to about 3 kg./cm.$^2$ gauge, a column top temperature of about 60 to about 110° C. and a column bottom temperature of about 100 to about 140° C. The low pressure rectifying column 13 consists of an upper rectifying part having 7 to 15 plates (shelves) or a packing height corresponding thereto and a lower heating part. In the heating part, steam is blown through pipe 14 directly into the depleted liquid to be rectified. All of the remaining portion of unreacted ammonia and carbon dioxide in the depleted liquid is distilled off in the low pressure rectifying column 13 and the water content in the gaseous mixture of said unreacted ammonia and carbon dioxide distilled off therein is less than 30 percent.

An aqueous solution of urea having had the unreacted ammonia and carbon dioxide distilled off in the low pressure rectifying column 13 is sent to a vacuum evaporator 16 through a conduit pipe 15; there, has removed through pipe 17 water equivalent to the water produced in the synthesis of urea plus the water introduced by the steam blown into the heating part of said low pressure rectifying column; and, thereafter, is sent as a urea slurry to a crystallizer 18. The aqueous solution of urea containing crystallized urea is separated into crystallized urea and a urea mother liquor by means of a centrifugal separator 19. The crystalline urea is taken out through conduit 20.

The urea mother liquor from the centrifugal separator 19 is fed into the top part of a low pressure absorbing column 22 through a conduit pipe 21. The gaseous mixture of ammonia and carbon dioxide from the low pressure rectifying column 13 is fed into the bottom part of the low pressure absorbing column 22 through a pipe 23 and is completely absorbed at a pressure of about 0 to about 3 kg./cm.$^2$ gauge. A cooler 24 is positioned in the lower part of column 22 to remove heat generated in said column. The resulting absorbate from column 22 enters a pressurizing pump 25 and is pressurized there. Then it is introduced into the middle part of a high pressure absorbing column 26 operating at a pressure of about 10 to about 25 kg./cm.$^2$ gauge wherein it absorbs a gaseous mixture of unreacted ammonia and carbon dioxide introduced into the bottom part of said high pressure absorbing column through a pipe 27 connected to the top of the high pressure rectifying column 7.

The excess ammonia not absorbed in the high pressure absorbing column 26 is washed with water or urea mother liquor introduced into the top part of said column through a conduit pipe 28 to remove the slight amount of carbon dioxide contained therein; then enters an ammonia condenser 30 through a pipe 29; is cooled there; and then is collected as liquid ammonia in a liquid ammonia storage tank 34 through a conduit pipe 33. Cooling water for the ammonia condenser is introduced through a pipe 31 and is discharged through a pipe 32. Fresh liquid ammonia corresponding to the urea removed through conduit 20 is fed into the liquid ammonia storage tank 34 through a conduit pipe 35.

The liquid ammonia taken out of the liquid ammonia storage tank 34 is pressurized by means of a pressurizing pump 36; enters the liquid ammonia preheater 11; is there made to exchange heat with the depleted liquid from the high pressure rectifying column 7; enters a second liquid ammonia preheater 38 through pipe 37; is made to exchange heat with the effluent before it enters the high pressure rectifying column 7, or is heated with steam; and then is introduced into the reactor 5 through the pipe 3. Pipes 39 and 40 are, respectively, an outlet and an inlet for the effluent before it enters the high pressure rectifying column 7 or for steam in case steam is used to heat the ammonia.

The absorbate, from the high pressure absorbing column 26 and containing the gaseous mixture from the high pressure rectifying column 7, is pressurized by means of a pressurizing pump 42 and is introduced into the reactor 5 through pipe 4.

The absorption heat in the high pressure absorbing column 26 is removed by passing a part of the urea slurry in the crystallizer 18 through a cooler 43 provided in the bottom part of said column and is utilized as a heat source for vacuum evaporation.

The following example is presented wherein all parts are by weight unless otherwise specified. The example relates to a typical charge passing through a continuous system, such as that described above.

*Example*

In producing 200 parts of urea from 113 parts of ammonia and 147 parts of carbon dioxide, the reactor 5 was charged with the above-mentioned amounts of ammonia and carbon dioxide, 131 parts of recovered ammonia and a recovered solution consisting of 60 parts of urea, 121 parts of ammonia, 82 parts of carbon dioxide and 48 parts of water. The ammonia was fed in as preheated to about 120° C.

When the above-mentioned charges were made to react for about 30 minutes under the conditions of a temperature of about 190° C. and a pressure of about 250 kg./cm.$^2$ gauge, an effluent consisting of 260 parts of urea, 252 parts of ammonia, 82 parts of carbon dioxide and 105 parts of water was obtained. This effluent was depressurized to a pressure of 15 kg./cm.$^2$ gauge whereby a part of the ammonia therein was discharged and the temperature dropped to about 120° C. The effluent was further cooled to 110° C. by heat exchanging with water and was introduced into the high pressure rectifying column 7 having 10 bubble cap plates. The temperature in this column was kept at 150° C. in the bottom part and at 110° C. in the top part and the pressure was held at 15 kg./cm.$^2$ gauge. A gaseous mixture consisting of 234 parts of ammonia, 72 parts of carbon dioxide and 16 parts of water was removed from the top of the column 7. The water content in this gaseous mixture amounts to about 5.5 percent by volume.

The depleted liquid discharged out of the bottom of the high pressure rectifying column 7 was made to exchange heat in preheater 11 with ammonia being sent to the reactor 5 whereby the ammonia was heated to about 120° C., and the depleted liquid was depressurized to about 0.7 kg./cm.$^2$ gauge and was introduced into the low pressure rectifying column 13 which was a packed column having a packing height of about 7 m. Steam of 5 kg./cm.$^2$ gauge was blown directly into the bottom part of the column 13 and the temperature therein was kept at 122° C. in the bottom part and at 70° C. in the top part. The pressure in column 13 was about 0.7 kg./cm.$^2$ gauge. Thus, unreacted ammonia and carbon dioxide in the depleted liquid were thoroughly distilled off. The gaseous mixture of ammonia and carbon dioxide from the low pressure rectifying column 13 consisted of 18 parts of ammonia, 10 parts of carbon dioxide and 2 parts of water (about 8 percent by volume).

The aqueous solution of urea from the low pressure rectifying column 13 consisted of 260 parts of urea and 157 parts of water. It was treated in a vacuum evaporator 16 and crystallizer 18 at 60 mm. Hg and 52° C. Thereafter, 200 parts of urea were separated with a centrifugal separator 19, leaving 90 parts of a mother liquor consisting of 60 parts of urea and 30 parts of water. Eighty-seven parts of the mother liquor were introduced into the low pressure absorbing column 22 operating at 0.7 kg./cm.$^2$ gauge and were made to absorb the gaseous mixture from the low pressure rectifying column 13. The resulting absorbate was then pressurized to a pressure of 15 kg./cm.$^2$ gauge, was introduced into the middle part of the high pressure absorbing column 26 and was made to absorb the gaseous mixture from the high pressure rectifying column 7. The absorption pressure was about 15 kg./cm.$^2$ gauge and the absorption temperature was about 100° C. In the absorbing column 26, all of the carbon dioxide and about half of the ammonia in the gaseous mixture from the high pressure rectifying column 7 were absorbed to obtain the aforementioned recovered solution which was then circulated to the reactor 5 and reused.

The unabsorbed ammonia was washed with 3 parts of the mother liquor introduced through pipe 28 into the top part of high pressure absorbing column 26. All of the carbon dioxide contained in the unabsorbed ammonia and some of the ammonia were absorbed in the mother liquor. One hundred and thirty-one parts of pure ammonia were obtained from the top part. This ammonia was cooled and liquefied in condenser 30 and was circulated together with make-up ammonia to the reactor 5. The mother liquor from the unabsorbed ammonia washing step was circulated to the reactor 5 after it had been used, together with the absorbate from low pressure absorption column, as the absorbent for the high pressure absorption in column 26.

The absorption heat generated in the high pressure absorbing column 26 was utilized by heat exchange by means of cooler 43 as a heat source for the vacuum crystallizer.

The amount of steam used in this example was about 1.4 parts per part of urea and was much smaller than in any prior total recycle process for synthesizing urea. The biuret in the urea produced was about 0.02 percent which is much lower than in any prior continuous process.

What is claimed is:

1. In the method of producing urea by the reaction of $CO_2$ with $NH_3$ to form an effluent containing urea, water, unreacted $CO_2$ and unreacted $NH_3$, that improvement in separating unreacted $CO_2$ and $NH_3$ from said effluent for reuse in producing urea comprising, subjecting said effluent to a first distillation at a gauge pressure of about 10 to about 25 kg./cm.$^2$, a head temperature of about 90° C. to about 130° C. and a still temperature of about 130° C. to about 170° C. to drive off $NH_3$ and $CO_2$ while minimizing the distillation of water and leaving a depleted liquid; subjecting said depleted liquid to a second distillation at a gauge pressure of about 0 to about 3 kg./cm.$^2$, a head temperature of about 60° C. to about 110° C. and a still temperature of about 100° C. to about 140° C. to drive off the remaining $CO_2$ and $NH_3$ while minimizing the distillation of water and leaving an aqueous solution containing urea; removing from said solution an amount of water approximately corresponding to that amount formed in said reaction and separating some urea from said solution to leave an aqueous urea-containing mother liquor; and absorbing the $CO_2$ and $NH_3$ from said first and second distillations in said liquor for reuse in the production of urea.

2. In the method of producing urea by the reaction of $CO_2$ with $NH_3$ to form an effluent containing urea, water, unreacted $CO_2$ and unreacted $NH_3$, that improvement in separating unreacted $CO_2$ and $NH_3$ from said effluent for reuse in producing urea comprising, subjecting said effluent to a first distillation at a gauge pressure of about 10 to about 25 kg./cm.$^2$, a head temperature of about 90° C. to about 130° C. and a still temperature of about 130° C. to about 170° C. to drive off $NH_3$ and $CO_2$ while minimizing the distillation of water and leaving a depleted liquid; subjecting said depleted liquid to a second distillation at a gauge pressure of about 0 to about 3 kg./cm.$^2$, a head temperature of about 60° C. to about 110° C. and a still temperature of about 100° C. to about 140° C. to drive off the remaining $CO_2$ and $NH_3$ while minimizing the distillation of water and leaving an aqueous solution containing urea; removing from said solution an amount of water approximately corresponding to that amount formed in said reaction and separating some urea from said solution to leave an aqueous urea-containing mother liquor; absorbing the $CO_2$ and $NH_3$ from said second distillation in said liquor at a gauge pressure of about 0 to about 3 kg./cm.$^2$ to form an absorbate; and absorbing the $CO_2$ and $NH_3$ from said first distillation in said absorbate at a pressure of about 10 to about 25 kg./cm.$^2$ to form a solution containing $CO_2$ and $NH_3$ for reuse in the production of urea.

3. The improvement as claimed in claim 1 wherein the step of removing water and separating urea is conducted at a pressure of 40 to 100 mm. mercury.

4. The improvement as claimed in claim 1 wherein urea is separated from said solution by crystallization and centrifugation.

5. The improvement as claimed in claim 1 wherein said first distillation is conducted in a first distillation column having 5 to 10 plates and said second distillation is conducted in a second distillation column having 7 to 15 plates.

6. The improvement as claimed in claim 2 wherein the gas evolving from the second said absorbing step contains $NH_3$ and some $CO_2$ and is washed with a portion of said liquor to remove $CO_2$ therefrom.

7. The improvement as claimed in claim 6 wherein the $NH_3$ evolving from the second said absorbing step is liquefied and thereafter reused in the production of urea.

8. The improvement as claimed in claim 5 wherein heat for said second distillation column is supplied by introducing steam into the bottom of said second column and wherein said amount of water removed approximately corresponds to the sum of that amount formed in said reaction plus that amount introduced by said steam.

9. The improvement claimed in claim 2 wherein the step of removing water and separating urea is conducted at a pressure of 40 to 100 mm. mercury.

10. The improvement as claimed in claim 2 wherein urea is separated from said solution from said second distillation by crystallization and centrifugation.

11. The improvement as claimed in claim 2 wherein said first distillation is conducted in a first distillation column having 5 to 10 plates and said second distillation is conducted in a second distillation column having 7 to 15 plates.

12. The improvement as claimed in claim 2 wherein water is separated from said solution from said second distillation by evaporation employing the heat of absorption evolved in said second absorbing step.

References Cited by the Examiner
FOREIGN PATENTS 885,692  12/1961  Great Britain.

ALEX MAZEL, *Primary Examiner.*

HENRY R. JILES, *Examiner.*